(12) United States Patent
Shiroki et al.

(10) Patent No.: US 10,148,836 B2
(45) Date of Patent: Dec. 4, 2018

(54) IMAGE READING APPARATUS HAVING MULTIPLE READING OPERATIONS

(71) Applicant: SEIKO EPSON CORPORATION, Tokyo (JP)

(72) Inventors: Toshiki Shiroki, Shiojiri (JP); Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 14/995,635

(22) Filed: Jan. 14, 2016

(65) Prior Publication Data

US 2016/0212287 A1 Jul. 21, 2016

(30) Foreign Application Priority Data

Jan. 20, 2015 (JP) .................................. 2015-008361

(51) Int. Cl.
*H04N 1/00* (2006.01)
*H04N 1/047* (2006.01)
*H04N 1/17* (2006.01)

(52) U.S. Cl.
CPC ....... *H04N 1/00798* (2013.01); *H04N 1/0476* (2013.01); *H04N 1/17* (2013.01)

(58) Field of Classification Search
None
See application file for complete search history.

(56) References Cited

U.S. PATENT DOCUMENTS

| 5,109,288 A | 4/1992 | Moriya |
| 2005/0225022 A1* | 10/2005 | Akiyama ............. B65H 3/0615 271/10.03 |
| 2007/0104524 A1* | 5/2007 | Suzuki ................. G03G 15/602 399/367 |
| 2008/0259778 A1* | 10/2008 | Hyot ..................... G11B 7/0055 369/121 |
| 2009/0315503 A1 | 12/2009 | Yoshihisa et al. |
| 2011/0211237 A1* | 9/2011 | Osakabe ............ H04N 1/00681 358/498 |
| 2012/0278032 A1* | 11/2012 | Chen .................... D21G 9/0009 702/150 |

FOREIGN PATENT DOCUMENTS

| JP | 01-51759 A | 2/1989 |
| JP | 02-217834 A | 8/1990 |

(Continued)

*Primary Examiner* — Lennin Rodriguezgonzalez
(74) *Attorney, Agent, or Firm* — Workman Nydegger

(57) ABSTRACT

An image reading apparatus includes a reading portion that reads an image on a target object; a motor that cause the reading portion to move; and a control portion that controls the reading portion and the motor. Further, in a case where the motor does not enter a step-out state, the control portion executes a first reading operation that causes the reading portion to read the image simultaneously with causing the motor to cause the reading portion to move at a high speed, and in a case where the motor enters the step-out state, the control portion executes a second reading operation that causes the reading portion to read the image simultaneously with causing the motor to cause the reading portion to move at a low speed, and generates image data having a resolution lower than a high resolution corresponding to the low speed.

10 Claims, 7 Drawing Sheets

(56) References Cited

FOREIGN PATENT DOCUMENTS

| | | |
|---|---|---|
| JP | 2003-270731 A | 9/2003 |
| JP | 2006-262584 A | 9/2006 |
| JP | 2008-085565 | 4/2008 |
| JP | 2009-049860 | 3/2009 |
| JP | 2009-273334 | 11/2009 |

* cited by examiner

FIG. 4

| MODE | REQUESTED RESOLUTION | MOVEMENT SPEED | | AMOUNT OF ELECTRIC CURRENT | SIZE OF ACQUIRED DATA | RESOLUTION OF GENERATED IMAGE |
|---|---|---|---|---|---|---|
| FIRST READING OPERATION | LOW | FIRST MOVEMENT SPEED | HIGH SPEED | SMALL | SMALL | LOW |
| | MIDDLE | | MIDDLE SPEED | | MIDDLE | MIDDLE |
| | HIGH | | LOW SPEED | | LARGE | HIGH |
| SECOND READING OPERATION | LOW | SECOND MOVEMENT SPEED | LOW SPEED | LARGE | LARGE | LOW |
| | MIDDLE | | | | LARGE | MIDDLE |
| | HIGH | | | | LARGE | HIGH |

IMAGE READING APPARATUS HAVING MULTIPLE READING OPERATIONS

BACKGROUND

1. Technical Field

The present invention relates to image reading apparatuses that read an image on a target object by causing a reading portion to move along the target object.

2. Related Art

Heretofore, as an example of image reading apparatuses, an image reading apparatus provided with a transparent plate that allows a document to be mounted thereon has been well known (for example, JP-A-2012-63521). In this image reading apparatus, an image on a target object, such as a document, is read via such a transparent plate by allowing the target object to be mounted on one side face of the transparent plate and simultaneously therewith causing a slider (a reading portion) to move at the other side face of the transparent plate.

Further, in such an image reading apparatus, the slider moves on the basis of driving by a motor (a driving source).

Thus, in an image reading apparatus disclosed in JP-A-2012-63521, when an ambient temperature value measured by using a temperature sensor is smaller than or equal to a predetermined value, the movement speed of the slider that is caused to move and read an image is made low. That is, the possibility in that the motor enters the step-out state is reduced by making a torque required to cause the slider to move correctly small. In such an image reading apparatus, however, for example, in conjunction with lowering of ambient temperature, a torque output by the motor decreases, but in contrast, a load applied to the motor that causes the slider to move increases due to the increase of the viscosity of a lubricant agent, and the like. For this reason, there sometimes occurs a case where the motor enters a step-out state as a result of the increase of the load applied to the motor in contrast to the decrease of the torque output by the motor.

By the way, in such an image reading apparatus, image data is generated by, simultaneously with causing a slider to move, continuously reading an amount of light received per unit time as one of pieces of data representing an image, and combining the pieces of data. Thus, when the movement speed of the slider is made low, an amount of the pieces of data that are read increases and, as a result, the size of the image data that are generated also increases.

In addition, this problem is not limited to image reading apparatuses that read an image on a target object by causing the slider to move, but has become substantially common to image reading apparatuses that read an image on a target object by causing a reading portion to move.

SUMMARY

An advantage of some aspects of the invention is that an image reading apparatus is provided, which makes it possible to, regardless of ambient environment changes, generate image data of a desired size.

Hereinafter, means provided in such an image reading apparatus and advantageous operation effects brought about by the means will be described.

An image reading apparatus according to an aspect of the invention includes a reading portion that reads an image on a target object; a driving source that cause the reading portion to move; and a control portion that controls the reading portion and the driving source. Further, in a case where the driving source does not enter a step-out state, the control portion executes a first reading operation that causes the reading portion to read the image simultaneously with causing the driving source to cause the reading portion to move at a first movement speed, and in a case where the driving source enters the step-out state, the control portion executes a second reading operation that causes the reading portion to read the image simultaneously with causing the driving source to cause the reading portion to move at a second movement speed lower than the first movement speed, and generates image data having a resolution lower than a resolution corresponding to the second movement speed.

According to this configuration, in the case where there is a possibility in that the driving source enters the step-out state due to ambient environment changes and the like, the movement speed of the reading portion is made low. In this way, a torque required to cause the reading portion to move correctly is made small, thus making it possible to reduce the possibility in that the driving source enters the step-out state. Moreover, in the case where the second reading operation that makes the movement speed of the reading portion low is executed, image data having a resolution lower than a resolution corresponding to the second movement speed is generated. Accordingly, regardless of the ambient environment changes, it is possible to acquire image data of a desired size.

In the above image reading apparatus, preferably, the reading portion reciprocates by moving in a first direction so as to be directed away from a reference position and moving in a second direction opposite the first direction, and after having driven the driving source so as to cause the reading portion to move in the first direction at a first speed by a predetermined distance from the reference position, the control portion drives the driving source so as to cause the reading portion to move in the second direction at a second speed lower than the first speed by the predetermined distance, and selects the second reading operation in a case where the reading portion has crossed the reference position during the movement of the reading portion in the second direction.

According to this configuration, after having caused the reading portion to move away from the reference position in the first direction at the first speed, the control portion causes the reading portion to move toward the reference position in the second direction at the second speed. The control portion can select a reading operation on the basis of detection of the reference position during the movement thereof in the second direction. That is, when the driving source does not enter the step-out state, the reading portion returns to the reference position after moving the same distance at any of the first speed and the second speed. However, when the driving source enters the step-out state, a distance of movement of the reading portion becomes smaller than that in a case where the driving source does not enter the step-out state. Further, when the reading portion is moved at the first speed higher than the second speed, the driving source is more likely to enter the step-out state than in a case at the second speed. Thus, when the reading portion is caused to move in the second direction at the second speed after having been caused to move in the first direction at the first speed, in the case where the driving source has entered the step-out state during the movement, the reading portion moves in the second direction past the reference position. Accordingly, it is possible to detect whether or not the driving source has entered the step-out state by detecting the reference position when the reading portion moves in the second direction.

In the above image reading apparatus, preferably, the reference position is a reading start position.

According to this configuration, since, generally, the image reading apparatus includes a detection portion that detects the reading portion located at the reading start position and the reading portion starts its movement from the reading start position to read the image on the target object, it is possible to not only suppress the increase of the number of components, but also easily detect whether or not the reading portion has crossed the reference position, by allowing the reading start position to function as the reference position and utilizing the result of the detection by the detection portion.

In the above image reading apparatus, preferably, the control portion determines whether or not the driving source enters the step-out state at any one or ones of timing points including a timing point immediately after a power on of the image reading apparatus, a timing point of executing a preview operation, a timing point of executing a scanning operation, a timing point after the scanning operation has been executed at at least one predetermined time, and a timing point after a predetermined elapsed time from a latest determination as to whether or not the driving source enters the step-out state.

According to this configuration, it is possible to reduce the possibility in that the operation of the image reading apparatus is occupied by the operation of determining whether or not the driving source enters the step-out state by allowing the control portion to make the determination as to whether or not the driving source enters the step-out state at any one or ones of the predetermined timing points.

In the above image reading apparatus, preferably, every time the control portion determines whether or not the driving source enters the step-out state, the control portion selects the first reading operation or the second reading operation, whichever is to be executed by the reading portion in reading of the image.

In a case where the image reading apparatus is driven, a load applied to the driving source that causes the reading portion to move may decrease due to the decrease of the viscosity of a lubricant caused by frictional heat and the like. That is, occurrence of the step-out of the driving source depends on an elapsed time and an operation state of the driven apparatus. Thus, in the case where the image reading apparatus has been set to the second reading operation in accordance with a prediction that the driving source will enter the step-out state, when the driving source does not enter the step-out state, the image reading apparatus has performed the second reading operation for entire period at the second movement speed lower than the first movement speed. According to the above configuration, every time the control portion determines whether or not the driving source enters the step-out state, the control portion selects the first reading operation or the second reading operation in which the reading portion reads an image. Thus, when the second reading operation is selected and the reading portion moves at the second movement speed, if the control portion determines that the driving source will not enter the step-out state, it is possible to allow the reading portion to read an image at the first movement speed that is higher than the second movement speed. Accordingly, the possibility of occurrence of step-out can be reduced while images can be read efficiently.

In the above image reading apparatus, preferably, the control portion executes the first reading operation by supplying the driving source with a first electric current, and the control portion executes the second reading operation by supplying the driving source with a second electric current whose amount is larger than an amount of the first electric current.

According to this configuration, it is possible to further reduce the possibility of the occurrence of the step-out state in the second reading operation that is selected when it is determined that the driving source is likely to enter the step-out state, by supplying the driving source with the second electric current whose amount is larger than an amount of the first electric current and thereby increasing the torque of the driving source.

In the above image reading apparatus, preferably, in a case where the driving source enters the step-out state, the control portion causes the reading portion to execute the second reading operation simultaneously with causing the driving source to cause the reading portion to move at the second movement speed, and generates image data having the same resolution as a resolution in a case where the control portion causes the reading portion to execute the first reading operation simultaneously with causing the driving source to cause the reading portion to move at the first movement speed, on the basis of data having been read through the execution of the second reading operation by the reading portion.

According to this configuration, even when causing the driving source to cause the reading portion to move at the second movement speed and causing the reading portion to execute the second reading operation, the control portion generates image data having the same resolution as a resolution in the case where the control portion causes the driving source to cause the reading portion to move at the first movement speed and causes the reading portion to execute the first reading operation. Accordingly, it is possible to, regardless of whether or not the driving source enters the step-out state, acquire image data of a desired size.

BRIEF DESCRIPTION OF THE DRAWINGS

The invention will be described with reference to the accompanying drawings, wherein like numbers reference like elements.

FIG. 4 is a table illustrating relations between movement speeds of the reading portion and resolutions.

DESCRIPTION OF EXEMPLARY EMBODIMENTS

Hereinafter, an image reading apparatus according to an embodiment will be described with reference to the drawings.

This image reading apparatus is a scanner of a flatbed type in which a reading portion reads an image on a target object, such as paper, which is mounted on one side of a transparent member while moving along the other side of the transparent member.

Figure 1:
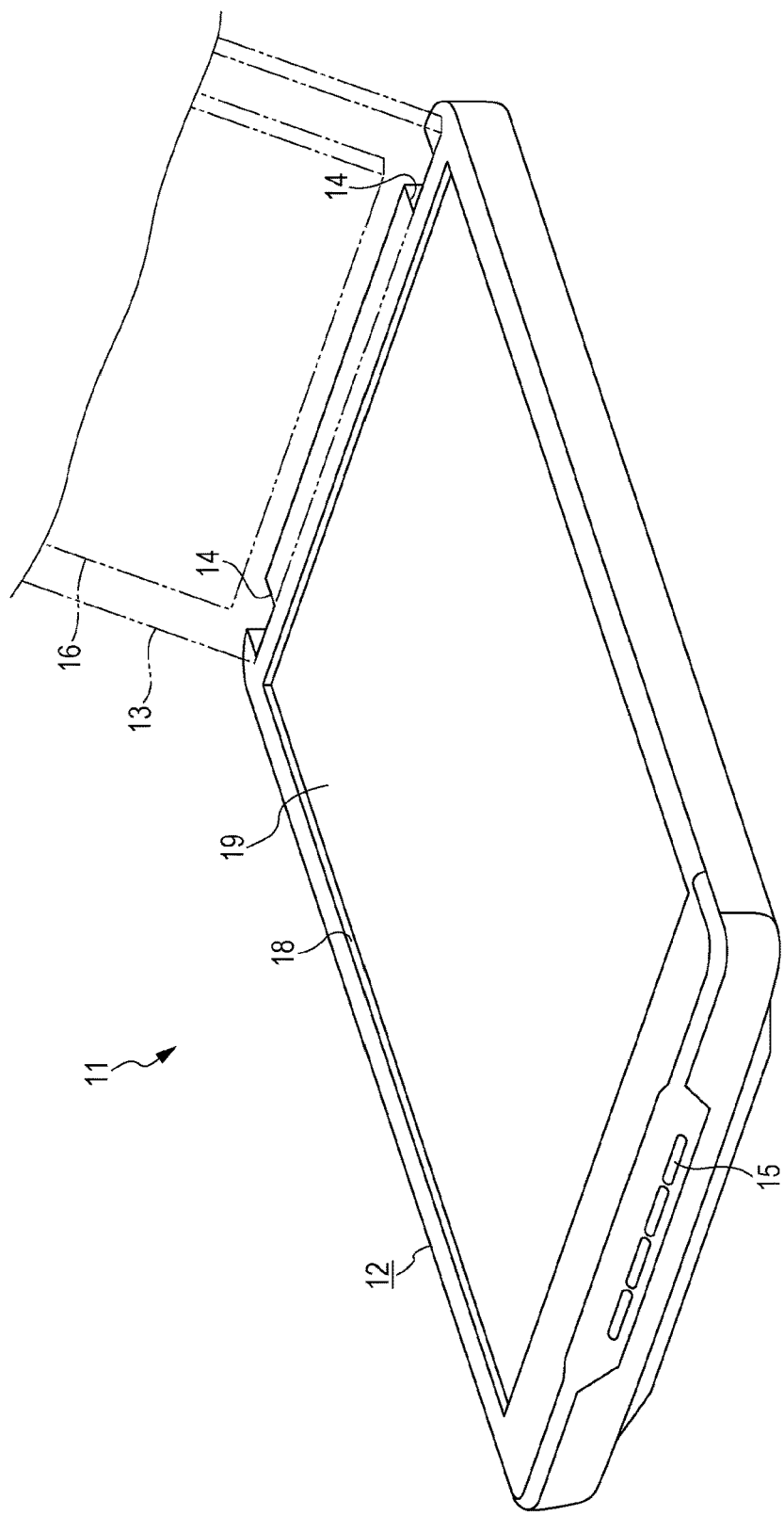
FIG. 1 is a perspective view of an image reading apparatus according to an embodiment of the invention.

As shown in FIG. 1, an image reading apparatus 11 includes a body 12 of a substantially rectangular box type, and a cover 13 that covers one side of the body 12. That is, connection portions 14 that function as a pivot axis about which the cover 13 pivots, and that interconnect the body 12 and the cover 13 are provided at one edge side of the body 12; while an operation portion 15, such as push button switches, for use in operating the image reading apparatus 11 is provided at the other side edge of the body 12. In addition, an elastic member 16, such as a sponge member, having a substantially rectangular shape is provided on a portion constituting the lower face of the cover 13 and becoming located at the side of the body 12 in a state in which the cover 13 is closed.

Further, an opening portion 18 of a substantially rectangular shape is formed on a portion constituting the upper face of the body 12 and being covered by the cover 13, and a transparent member 19, such as a member made of glass, is provided so as to block off the opening portion 18. In addition, the size of the elastic member 16 and the size of a portion constituting the transparent member 19 and being exposed through the opening portion 18 are substantially the same. Further, a target object (omitted from illustration), such as a document, is mounted on the transparent member 19 in a state in which the cover 13 is open, and when the cover 13 is closed in a state in which the target object is mounted on the transparent member 19, the target object is closely attached to the transparent member 19 by being pressure-stressed by the elastic member 16.

Figure 2:
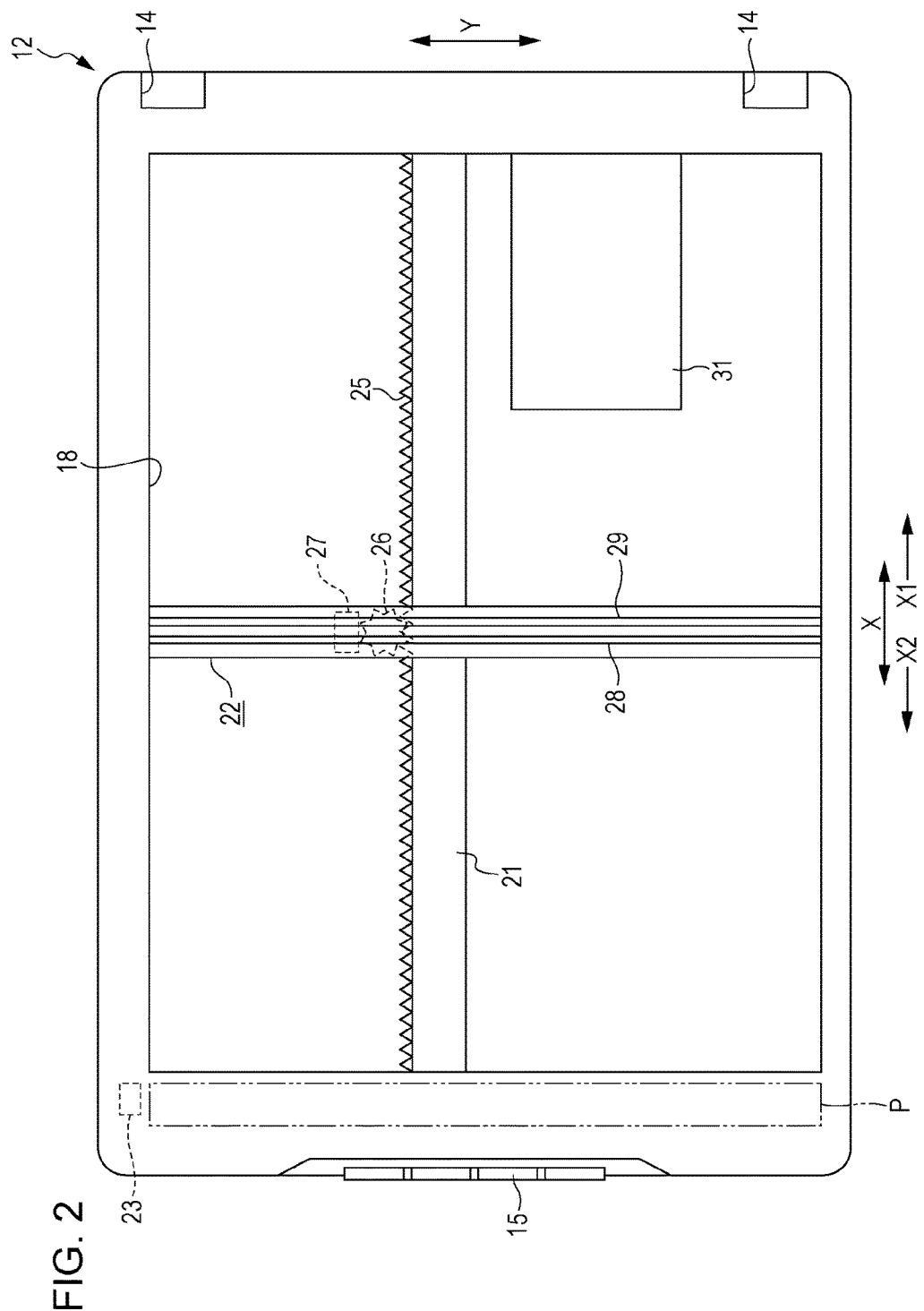
FIG. 2 is a schematic plan view illustrating an internal configuration of a body of the image reading apparatus. In the drawing, a transparent member is not shown.

As shown in FIG. 2, a reading portion 22 that reciprocates in a movement direction X parallel to a long side of the body 12 in a state of being guided by the guide portion 21 is provided inside the body 12. That is, the reading portion 22 reads an image on the target object mounted on the transparent member 19 (omitted from illustration in FIG. 2) while moving in the movement direction X.

Further, a detection portion 23 that detects the reading portion 22 being located at a reference position P is provided at a position near the operation portion 15 in the inside of the body 12. In addition, the detection portion 23 can be made, for example, a transmissive sensor including a light emitting element and a light receiving element that are disposed so as to face each other, or a reflective sensor that receives light having been reflected at the target object.

Further, a rack 25 is formed across the movement direction X in the guide portion 21 extending in the movement direction X. Meanwhile, in the reading portion 22, there are provided a pinion 26 that is engaged with the rack 25 and a motor 27 that is an example of the driving source and that causes the reading portion 22 to move by being connected to the pinion 26. This motor 27 is, for example, a stepping motor.

Further, the motor 27 causes the reading portion 22 to move in a first direction X1 by normally rotating the pinion 26 by being normally driven. Moreover, the motor 27 causes the reading portion 22 to move in a second direction X2 by reversely rotating the pinion 26 by being reversely driven. That is, the reading portion 22 reciprocates in the X direction by moving in the first direction X1 so as be directed away from the reference position P and the operation portion 15, and moving in the second direction X2 opposite the first direction X1 so as to be directed close to the reference position P and the operation portion 15.

In addition, the reference position P of this embodiment is a reading start position at which the reading portion 22 is located when starting a scanning operation for reading an image on the target object. Specifically, the reference position P is a position denoted by a chain double-dashed line in FIG. 2, and is set at a position that is located slightly near the connection portions 14 from an edge portion constituting a region where the reading portion 22 is movable and being located at the side of the operation portion 15. That is, the reading portion 22 is capable of, during its movement in the second direction X2, passing through the reference position P and further moving up to a position where the reading portion 22 is not detected by the detection portion 23.

Further, a light source 28 that emits light across a width direction Y intersecting with (perpendicular to, in this embodiment) the movement direction X in the opening portion 18 and a light reception portion 29 that receives light having been reflected at the target object across the width direction Y are mounted on the reading portion 22.

Further, in the inside of the body 12, a control portion 31 that controls the image reading apparatus 11 is provided at a bottom face portion that is located at a side farther than a space region where the reading portion 22 moves, from the transparent member 19. That is, the control portion 31 generates image data corresponding to an image on the target object mounted on the transparent member 19 by controlling the motor 27, the reading portion 22, and the like, on the basis of information having been input from the operation portion 15 and the detection portion 23.

Figure 3:
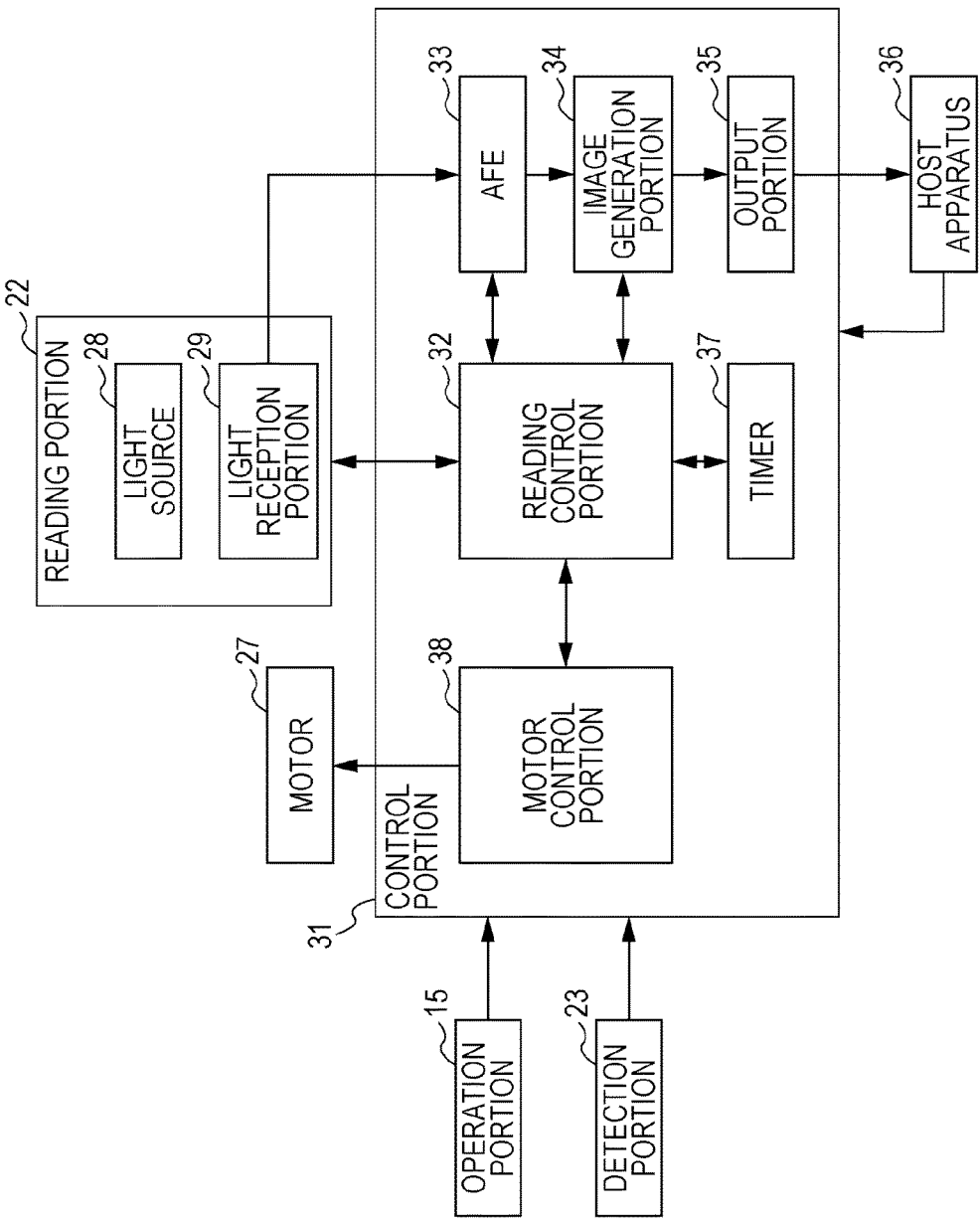
FIG. 3 is a block diagram illustrating an electric configuration of the image reading apparatus.

As shown in FIG. 3, the control portion 31 includes a reading control portion 32 that controls the reading portion 22 on the basis of information having been acquired from the operation portion 15 and the detection portion 23, and a motor control portion 38 that controls the motor 27. Further, the control portion 31 includes an analog front-end (AFE) 33 that performs processing on data having been output from the light reception portion 29, and an image generation portion 34 that generates image data on the basis of data having been output from the AFE 33. Further, the image data having been generated by the image generation portion 34 is output to a host apparatus 36, such as a personal computer, via an output portion 35. Moreover, the control portion 31 includes a timer 37.

Further, the reading control portion 32 controls turning on/off of the light source 28 and timing points of transferring data corresponding to light having been received by the light reception portion 29 to the AFE 33. In addition, the AFE 33 is constituted of a particular IC (an analog front-end IC), and performs a gain adjustment for increasing/decreasing the amplitude of an input analog signal in accordance with a preset gain, and performs an A/D conversion for converting analog data into digital data. Further, the AFE 33 may be mounted on a substrate (omitted from illustration) installed in the reading portion 22.

Next, relations between movement speeds of the reading portion 22 and resolutions in each of modes will be described with reference to FIG. 4.

As shown in FIG. 4, a first reading operation is an operation that is selected in a normal state in which the motor 27 does not enter the step-out state. That is, when the first reading operation corresponding to the normal state is selected, the control portion 31 causes the reading portion 22 to read an image simultaneously with causing the motor 27 to cause the reading portion 22 to move at a first movement speed.

In addition, the first movement speed is a speed that is set in accordance with a requested resolution, and when a low resolution is requested, the first movement speed is set to a high speed; while when a high resolution is requested, the first movement speed is set to a low speed. Further, in this embodiment, the first movement speed is discretely set into three stages of the high speed, a middle speed, and the low speed, and the low speed is selected in the case where the high resolution is requested; the middle speed is selected in the case where a middle resolution is requested; and the high speed is selected in the case where the low resolution is requested.

Further, the size of image data having been read and acquired by the reading portion 22 becomes smaller as the movement speed of the reading portion 22 becomes higher, and becomes larger as the movement speed of the reading portion 22 becomes lower. Moreover, image data having a low resolution is generated from image data of a small size, and image data having a high resolution is generated from image data of a large size.

Further, a second reading operation is an operation that is selected in the case where the motor 27 enters the step-out state. That is, when the second reading operation corresponding to the step-out state is selected, the control portion 31 causes the reading portion 22 to read an image simultaneously with causing the motor 27 to cause the reading portion 22 to move at a second movement speed lower than the first movement speed.

In addition, the second movement speed is a speed that is set regardless of any requested resolution and that is lower than a maximum speed in the first movement speed (the maximum speed being associated with the high speed in this embodiment). Further, the second movement speed is preferable to be set to a speed lower than or equal to a minimum speed in the first movement speed (the minimum speed being associated with the low speed in this embodiment), and the second movement speed in this embodiment is set to a speed equal to the low speed that is the lowest speed in the first movement speed. For this reason, a load applied to the motor 27 that causes reading portion 22 to move at the second movement speed becomes smaller than or equal to a load applied to the motor 27 that causes the reading portion 22 to move at the first movement speed that is a high speed.

Further, the size of data read by the reading portion 22 that moves at the low speed is large. Thus, although, when the high resolution is requested, image data having the relevant high resolution is generated by using the data having been read by the reading portion 22 as it is, when the middle resolution or the low resolution is requested, image data having the requested resolution is generated by thinning out the data having been read by the reading portion 22. In addition, the size of image data becomes larger as a resolution of the image data becomes higher.

Specifically, in the case where the motor 27 enters the step-out state, the control portion 31 generates image data such that the generated image data has the same resolution as that of image data that is generated from data having been read by the reading portion 22 that moves at the first movement speed. That is, in the case where, for example, the first movement speed is twice the second movement speed, a time required to fully perform a scanning operation when the reading portion 22 is caused to move at the first movement speed is half a time required to fully perform the scanning operation when the reading portion 22 is caused to move at the second movement speed. Accordingly, in the case where, with respect to the first movement speed and the second movement speed, an amount of data acquired per unit time is the same, an amount of data acquired by the reading portion 22 that is caused to move at the first movement speed is twice an amount of data acquired by the reading portion 22 that is caused to move at the second movement speed. Thus, the control portion 31 generates image data having the same resolution as that of image data acquired by the reading portion 22 that is caused to move at the first movement speed, by thinning out half of the image data having been acquired by the reading portion 22 that is caused to move at the second movement speed.

Further, the motor 27 is supplied with a small amount of electric current in the first reading operation, and is supplied with a large amount of electric current in the second reading operation. That is, the control portion 31 executes the first reading operation by supplying the motor 27 with a first electric current, and executes the second reading operation by supplying the motor 27 with a second electric current whose amount is larger than that of the first electric current. Thus, the torque of the motor 27 in the second reading operation is larger than the torque of the motor 27 in the first reading operation.

A step-out state determination process routine for determining whether or not the motor 27 enters the step-out state will be described referring to a flowchart shown in FIGS. 5 to 7.

In addition, this step-out state determination process routine is executed at a time point immediately after the power on of the image reading apparatus 11, and thereafter, the step-out state determination process routine is repeatedly executed by the control portion 31 until the power off of the image reading apparatus 11. In addition, it is assumed that the reading portion 22 is located at the reference position P at the time point immediately after the power on of the image reading apparatus 11.

Figure 5:
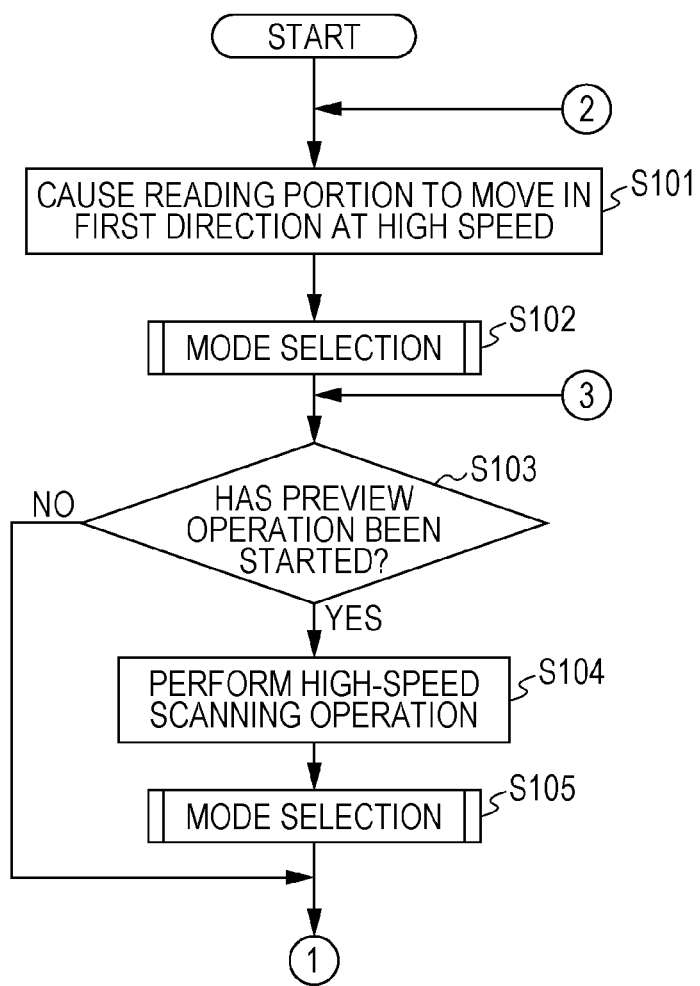
FIG. 5 is a flowchart illustrating step-out state determination processing.
Figure 6:
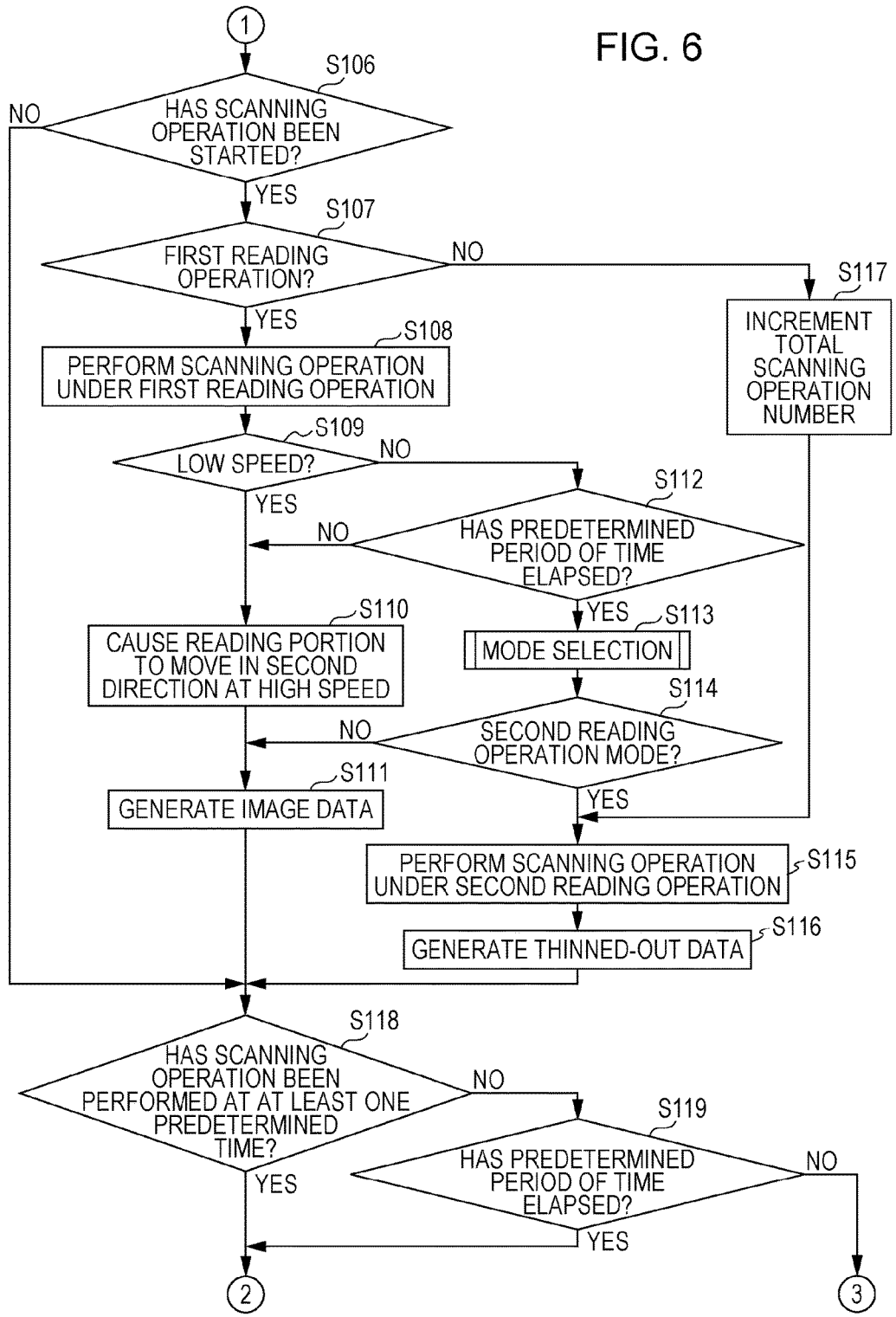
FIG. 6 is a flowchart illustrating step-out state determination processing.

As shown in FIG. 5, in step S101, the control portion 31 supplies the motor 27 with a small amount of electric current and simultaneously therewith drives the motor 27 so as to cause the reading portion 22 to move in the first direction X1 from the reference position P at a high speed as an example of the first speed by a predetermined distance. In addition, the predetermined distance is a distance that is set within a range where the reading portion 22 is movable in the first direction X1 from the reference position P. Specifically, the predetermined distance can be set to any distance of a degree that, during a reciprocating movement of the relevant predetermined distance by the reading portion 22, enables detection of a distance difference between a distance in a case where the motor 27 has entered the step-out state and a distance in a case where the motor 27 has not entered the step-out state. In addition, in this embodiment, the pinion 26 is caused to rotate once and thereby the reading portion 22 is caused to move approximately three centimeters. Further, after having caused the reading portion 22 to move, the control portion 31 executes a mode selection routine in step S102.

Figure 7:
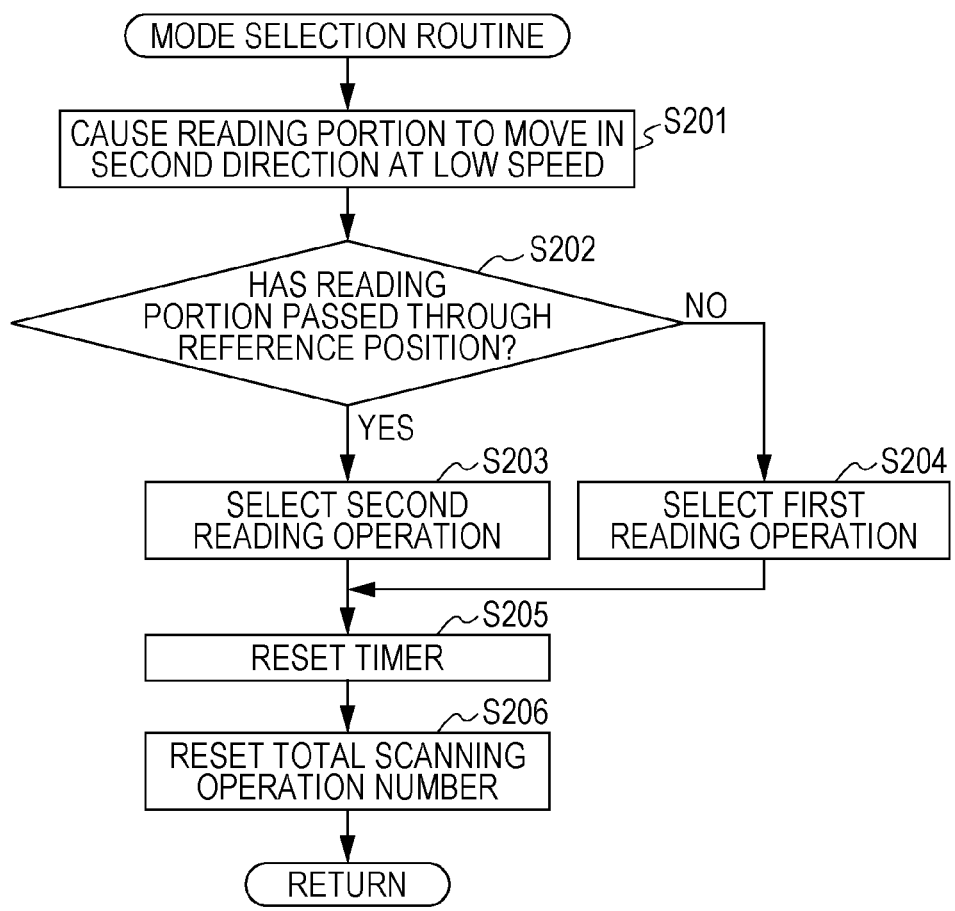
FIG. 7 is a flowchart illustrating mode selection processing.

In the mode selection routine, as shown in FIG. 7, in step S201, the control portion 31 causes the reading portion 22 to move in the second direction X2 at a low speed. That is, the control portion 31 supplies the motor 27 with a small amount of electric current and drives the motor 27 so as to cause the reading portion 22 to move by the same distance as the predetermined distance in step S101 in the second direction X2 at a low speed as an example of the second speed, this low speed being lower than the high speed as an example of the first speed.

Further, in step S202, the control portion 31 determines whether or not the reading portion 22 has crossed the reference position P during the movement of the reading portion 22 in the second direction X2 in step S201, on the basis of the result of detection by the detection portion 23. That is, in the case where, after having entered a state of detecting the reading portion 22, the detection portion 23 has returned to a state of not detecting the reading portion 22, the control portion 31 determines that the reading portion 22 has passed though the reference position P. In contrast, in the case where the reading portion 22 has halted in a state in which the detection portion 23 remains in the state of detecting the reading portion 22, the control portion 31 determines that the reading portion 22 has not passed through the reference position P.

Further, in the case where the reading portion 22 has crossed the reference position P (YES in step S202), the control portion 31 selects the second reading operation corresponding to the step-out state in step S203. In contrast, in the case where the reading portion 22 has not crossed the reference position P (NO in step S202), the control portion 31 selects the first reading operation corresponding to the normal state in step S204. Subsequently, the control portion 31 resets the timer 37 in step S205, and then, in step S206, the control portion 31 resets a total scanning operation number and causes the process flow to return to the step-out state determination process routine. That is, through the processes in steps S101 and S102, the control portion 31 determines whether or not the motor 27 enters the step-out state at the time point immediately after the power on.

Returning to FIG. 5, in step S103 of the step-out state determination process routine, the control portion 31 determines whether or not a preview operation has been started. That is, upon input of a command for instructing the start of reading an image for the preview operation from the operation portion 15 or the host apparatus 36 (YES in step S103), the control portion 31 executes a high-speed scanning operation in step S104. That is, the control portion 31 causes the reading portion 22 to move in the first direction X1 from the reference position P at a high speed and simultaneously therewith read an image on a target object that is mounted on the transparent member 19. At this time, the control portion 31 drives the motor 27 so as to cause the reading portion 22 to move by a scanning distance. In addition, the scanning distance may be a maximum distance within a range where the reading portion 22 is movable in the first direction X1 from the reference position P, or may be a distance that chances in accordance with the size of the target object. Further, the control portion 31 generates image data having a low resolution on the basis of data having been read by the reading portion 22, and then displays an image corresponding to the generated image data on a display portion (omitted from illustration) included in the host apparatus 36 or the like.

In step S105 subsequent thereto, the control portion 31 executes the mode selection routine just like in step S102, and then causes the process flow to proceed to step S106. In this regard, however, in the mode selection routine executed in step S105, a distance by which the reading portion 22 is caused to move in the second direction X2 at the low speed in step S201 (refer to FIG. 7) is different. That is, in step S201, the control portion 31 drives the motor 27 so as to cause the reading portion 22 to move by the same distance as the scanning distance by which the reading portion 22 moves in step S104. In this way, through the processes in steps S104 and S105, the control portion 31 determines whether or not the motor 27 enters the step-out state during the execution of the preview operation.

Further, in the case where, in step S103, the preview operation is not started (NO in step S103), in step S106, the control portion 31 determines whether or not a scanning operation has been started. In addition, the scanning operation is an operation for reading an image on a target object simultaneously with causing the reading portion 22 to move, and a desired resolution and a command for instructing the start of the scanning operation is input from the operation portion 15 or the host apparatus 36.

In the case where the scanning operation has been started (YES in step S106), in step S107, the control portion 31 determines whether or not a selected operation is the first reading operation. Further, in the case where the first reading operation is selected (YES in step S107), in step S108, the control portion 31 executes the scanning operation under the first reading operation. That is, the control portion 31 causes the reading portion 22 to read an image simultaneously with causing the reading portion 22 to move in the first direction X1 at a speed in accordance with the desired resolution.

Further, when the scanning operation has been completed, in step S109, the control portion 31 determines whether or not the first movement speed of the reading portion 22 in step S108 is a low speed. In the case where the first movement speed is the low speed (YES in step S109), in step S110, the control portion 31 drives the motor 27 so as to cause the reading portion 22 to move in the second direction X2 at a high speed and return to the reference position P. Moreover, in step S111, the control portion 31 generates image data having a high resolution corresponding to the first movement speed (low speed) on the basis of the data having been acquired in step S108.

Further, in the case where the scanning operation in step S108 has been executed at a middle speed or a high speed (NO in step S109), in step S112, the control portion 31 determines whether or not a period of time having been counted by the timer 37 has reached a predetermined period of time (for example, thirty minutes to one hour). That is, in the case where the predetermined period of time has not elapsed since the selection of a mode (NO in step S112), the control portion 31 causes the process flow to proceed to step S110. In contrast, in the case where the predetermined period of time has elapsed (YES in step S112), in step S113, the control portion 31 executes the mode selection routine just like in step S102, and then causes the process flow to proceed to step S114. In this regard, however, in the mode selection routine executed in step S113, a distance by which the control portion 31 causes the reading portion 22 to move in the second direction X2 at the low speed in step S201 (refer to FIG. 7) is different. That is, in step S201, the control portion 31 drives the motor 27 so as to cause the reading portion 22 to move by the same distance as the scanning distance by which the reading portion 22 has been caused to move in order to execute the scanning operation in step S108. In this way, through the processes in steps S108 and S113, the control portion 31 determines whether or not the motor 27 enters the step-out state during the execution of the scanning operation.

In step S114, the control portion 31 determines whether or not the second reading operation corresponding to the step-out state has been selected. That is, in the case where the first reading operation corresponding to the normal state has been selected (NO in step S114), the control portion 31 causes the process flow to proceed to step S111, where the control portion 31 generates image data having a resolution corresponding to the first movement speed. In contrast, in the case where the second reading operation has been selected (YES in step S114), the control portion 31 causes the process flow to proceed to step S115, where the control portion 31 executes a scanning operation under the second reading operation.

That is, regardless of the desired resolution, the control portion 31 causes the reading portion 22 to move at a low speed (the second movement speed) and simultaneously therewith output pieces of data representing amounts of light having been received at constant intervals to the control portion 31. Further, in step S116, the control portion 31 generates image data by thinning out the pieces of data having been output from the reading portion 22. Specifically, in the case where the motor 27 has entered the step-out state, the control portion 31 drives the motor 27 so as to cause the reading portion 22 to execute the second reading operation simultaneously with causing the reading portion 22 to move at the second movement speed. Further, the control portion 31 generates image data having the same resolution as that in the case where the control portion 31 drives the motor 27 so as to cause the reading portion 22 to execute the first reading operation simultaneously with causing the reading portion 22 to move at the first movement speed, on the basis of data having been read by the reading portion 22 in the second reading operation.

Further, in the case where, in step S107, the second reading operation is selected (NO in step S107), in step S117, the control portion 31 increments the total scanning operation number by one, and then causes the process flow to proceed to step S115. Moreover, in the case where, in step S106, the scanning operation has not been started (NO in step S106), the control portion 31 causes the process flow to proceed to step S118.

In step S118, the control portion 31 determines whether or not the scanning operation has been executed at at least one predetermined time (once or at a plurality of times) under the second reading operation since a latest mode selection. That is, in the case where the total scanning operation number is larger than or equal to a predetermined number (YES in step S118), the control portion 31 causes the process flow to proceed to step S101. In addition, through subsequently executed processes in steps S101 and S102, the control portion 31 determines whether or not the motor 27 enters the step-out state after having executed the scanning operation at at least one predetermined time.

In the case where, in step S118, the total scanning operation number is smaller than the predetermined number (NO in step S118), in step S119, the control portion 31 determines whether or not the predetermined period of time has elapsed, just like in step S112. Further, in the case where the predetermined period of time has elapsed (YES in step S119), the control portion 31 causes the process flow to proceed to step S101. In addition, in subsequently executed processes in steps S101 and S102, the control portion 31 determines whether or not the motor 27 enters the step-out state after a predetermined elapsed time from a latest determination as to whether or not the motor 27 enters the step-out state. Further, in the case where, in step S119, the predetermined period of time has not yet elapsed (NO in step S119), the control portion 31 causes the process flow to proceed to step S103.

Next, in the image reading apparatus 11, the determination as to whether or not the motor 27 enters the step-out state as well as processes performed when generating image data will be described.

In addition, as shown in the above flowchart, the control portion 31 determines whether or not the motor 27 enters the step-out state at each of timing points that are a timing point immediately after the power on of the image reading apparatus 11, a timing point of executing the preview operation, a timing point of executing the scanning operation, a timing point after the scanning operation has been executed at at least one predetermined time, and a timing point after a predetermined elapsed time from a latest determination as to whether or not the motor 27 enters the step-out state.

The at least one predetermined time and the predetermined period of time are each different depending on the type of the image reading apparatus 11, and thus are each set on the basis of experiments. That is, when the reading portion 22 is caused to move, there occurs a case where a load applied to the motor 27 that causes the reading portion 22 to move is reduced due to driving heat of the control portion 31, frictional heat between the guide portion 21 and the reading portion 22, and the like. Thus, at each of the at least one predetermined time and the predetermined period of time, the motor 27 becomes unlikely to enter the step-out state along with the movements of the reading portion 22 even during a normal operation.

Further, every time the control portion 31 determines whether or not the motor 27 enters the step-out state at each of the above timing points, the control portion 31 selects the first reading operation or the second reading operation, whichever is to be executed by the reading portion 22 in reading of an image. Specifically, the control portion 31 drives the motor 27 so as to cause the reading portion 22 to move in the first direction X1 from the reference position P at a high speed or a middle speed as an example of the first speed by a predetermined distance. Thereafter, the control portion 31 drives the motor 27 so as to cause the reading portion 22 to move in the second direction X2 at a low speed as an example of the second speed by the predetermined distance. In addition, the operation of causing the reading portion 22 to move in the first direction X1 may be performed simultaneously with the execution of each of, or any one of the preview operation and the scanning operation. Further, the control portion 31 selects the second reading operation corresponding to the step-out state in the case where the reading portion 22 has crossed the reference position P during its movement in the second direction X2, and selects the first reading operation corresponding to the normal state in the case where the reading portion 22 has not crossed the reference position P during its movement in the second direction X2.

Further, the control portion 31 executes a scanning operation under the selected one of the first reading operation and the second reading operation, and the image generation portion 34 generates image data in a way in accordance with the selected one of the first reading operation and the second reading operation. That is, through the scanning operation under the first reading operation, the control portion 31 causes the light source 28 to continuously emit light and simultaneously therewith causes the light reception portion 29 to output pieces of data corresponding to amounts of light having been received at constant intervals. Further, the control portion 31 generates image data by combining the pieces of data having been output from the light reception portion 29.

Meanwhile, through the scanning operation under the second reading operation, the control portion 31 generates image data having a resolution lower than a high resolution corresponding to the low speed by thinning out pieces of data having been output in the same way as in the first reading operation. That is, although, when an image is read at the low speed, an amount of data enough to generate image data having a high resolution can be acquired, the image generation portion 34 of the control portion 31 generates image data on the basis of data whose amount is smaller than the amount of data that can be acquired.

Specifically, in the case where a command for instructing the execution of a scanning operation at a low resolution is input in a state in which the first reading operation is selected, the control portion 31 generates image data having the low resolution by causing the reading portion 22 to move in the first direction X1 at a high speed as an example of the first movement speed and read an image.

Further, in the case where a command for instructing the execution of a scanning operation at a middle resolution is input in a state in which the first reading operation is selected, the control portion 31 generates image data having the middle resolution by causing the reading portion 22 to move in the first direction X1 at a middle speed as an example of the first movement speed and read an image. Further, in the case where a command for instructing the execution of a scanning operation at a high resolution is input in a state where the first reading operation is selected, the control portion 31 generates image data having the high resolution by causing the reading portion 22 to move in the first direction X1 at a low speed as an example of the first movement speed and read an image.

Meanwhile, in a state in which the second reading operation is selected, the control portion 31 drives the motor 27 to cause the reading portion 22 to move at the second movement speed, but generates image data having a resolution corresponding to the first movement speed. That is, in the case where a command for instructing the execution of a scanning operation at a low resolution is input, the control portion 31 causes the reading portion 22 to move at a low speed as an example of the second movement speed and read an image. In addition, at this time, the reading portion 22 outputs an amount of data enough to generate image data having a high resolution. Thus, the control portion 31 thins out the output data and thereby generates the same image data having the low resolution as image data that is generated when the reading portion 22 is caused to move at the first movement speed (high speed) corresponding to the low resolution.

Further, in the case where a command for instructing the execution of a scanning operation at a middle resolution is input, the control portion 31 generates image data having the middle resolution by causing the reading portion 22 to move in the first direction X1 at the low speed as an example of the second movement speed and read an image. In addition, at this time, the reading portion 22 outputs an amount of data enough to generate image data having a high resolution. Thus, the control portion 31 thins out the output data and thereby generates the same image data having the middle resolution as image data that is generated when the reading portion 22 is caused to move at the first movement speed (middle speed) corresponding to the middle resolution.

Moreover, in the case where a command for instructing the execution of a scanning operation at a high resolution is input, the control portion 31 causes the reading portion 22 to move in the first direction X1 at the low speed as an example of the second movement speed and read an image, and generates the same image data having the high resolution as image data that is generated when the reading portion 22 is caused to move at the first movement speed (low speed) corresponding to the high resolution, on the basis of data having been output from the reading portion 22.

According to the above embodiment, the following advantageous effects are brought about.

(1) In the case where there is a possibility in that the motor 27 enters the step-out state due to ambient environment changes and the like, the movement speed of the reading portion 22 is made low. In this way, a torque required to cause the reading portion 22 to move correctly is made small, thus making it possible to reduce the possibility in that the motor 27 enters the step-out state. Moreover, in the case where the second reading operation that makes the movement speed of the reading portion 22 low is executed, image data having a resolution lower than a resolution corresponding to the low speed is generated. Accordingly, regardless of the ambient environment changes, it is possible to acquire image data of a desired size.

(2) After having caused the reading portion 22 to move away from the reference position P in the first direction X1 at the high speed, the control portion 31 causes the reading portion 22 to move toward the reference position P in the second direction X2 at the low speed. The control portion 31 can select a reading operation on the basis of detection of the reference position P during the movement thereof in the second direction X2. That is, when the driving source does not enter the step-out state, the reading portion 22 returns to the reference position P after moving the same distance at any of the high speed and the low speed. However, when the motor 27 enters the step-out state, a distance of movement of the reading portion 22 becomes smaller than that in a case where the motor 27 does not enter the step-out state. Further, when the reading portion 22 is moved at the high speed, the motor 27 is more likely to enter the step-out state than in a case at the low speed. Thus, when the reading portion 22 is caused to move in the second direction X2 at the low speed after having been caused to move in the first direction X1 at the high speed, in the case where the motor 27 has entered the step-out state during the movement, the reading portion 22 moves in the second direction X2 past the reference position P. Accordingly, it is possible to detect whether or not the motor 27 has entered the step-out state by detecting the reference position P when the reading portion 22 moves in the second direction X2.

(3) Generally, the image reading apparatus 11 includes the detection portion 23 that detects the reading portion 22 located at a reading start position, and the reading portion 22 starts its movement from the reading start position to read an image on a target object. Thus, it is possible to not only suppress the increase of the number of components, but also easily detect whether or not the reading portion 22 has crossed the reference position P, by allowing the reading start position to function as the reference position P and utilizing the result of the detection by the detection portion 23.

(4) It is possible to reduce the possibility in that the operation of the image reading apparatus 11 is occupied by the operation of determining whether or not the motor 27 enters the step-out state by allowing the control portion 31 to make the determination as to whether or not the motor 27 enters the step-out state at any one or ones of the predetermined timing points.

(5) In a case where the image reading apparatus 11 is driven, a load applied to the motor 27 that causes the reading portion 22 to move may decrease due to the decrease of the viscosity of a lubricant agent caused by frictional heat and the like. That is, occurrence of the step-out of the motor 27 depends on an elapsed time and an operation state of the driven apparatus. Thus, in the case where the image reading apparatus 11 has been set to the second reading operation in accordance with a prediction that the motor 27 will enter the step-out state, when the motor 27 does not enter the step-out state, the image reading apparatus 11 has performed the second reading operation for entire period at the second movement speed lower than the first movement speed. According to the above configuration, every time the control portion 31 determines whether or not the motor 27 enters the step-out state, the control portion 31 selects the first reading operation or the second reading operation in which the reading portion 22 reads an image. Thus, when the second reading operation is selected and the reading portion 22 moves at the low speed, if the control portion 31 determines that the motor 27 will not enter the step-out state, it is possible to allow the reading portion 22 to read an image at the high speed. Accordingly, the possibility of occurrence of step-out can be reduced while images can be read efficiently.

(6) It is possible to further reduce the possibility of the occurrence of the step-out state in the second reading operation that is selected when it is determined that the motor 27 is likely to enter the step-out state, by supplying the driving the motor 27 with the second electric current whose amount is larger than an amount of the first electric current and thereby increasing the torque of the motor 27.

(7) Even when causing the motor 27 to cause the reading portion 22 to move at the second movement speed and causing the reading portion 22 to execute the second reading operation, the control portion 31 generates image data having the same resolution as a resolution in the case where the control portion 31 causes the motor 27 to cause the reading portion 22 to move at the first movement speed and causes the reading portion 22 to execute the first reading operation. Accordingly, it is possible to, regardless of whether or not the motor 27 enters the step-out state, acquire image data of a desired size.

(8) It is possible to determine whether or not the motor 27 enters the step-out state simultaneously with executing the preview operation or the scanning operation by, in order to execute the preview operation or the scanning operation, causing the reading portion 22 to move in the first direction X1 by a scanning distance and then causing the reading portion 22 to move in the second direction X2 by the scanning distance. That is, it is possible to efficiently determine whether or not the motor 27 enters the step-out state by allowing the movement of the reading portion 22 for the purpose of each of, or any one of the preview operation and the scanning operation to be performed simultaneously with the movement of the reading portion 22 for the purpose of the determination as to whether or not the motor 27 enters the step-out state.

In addition, the above embodiment may be changed in the following methods.

In the above embodiment, the speed at which the reading portion 22 is caused to move may not be selected from among the discrete speeds, but may be selected from among continuous speeds.

In the above embodiment, when the power of the image reading apparatus 11 is turned off, the power may be turned off after the selection of the first reading operation corresponding to the normal state.

In the above embodiment, the image data that is generated on the basis of data having been read by the reading portion 22 in the second reading operation may not be image data having the same resolution as a requested resolution, but may be image data having a resolution near the requested resolution.

In the above embodiment, as the method for generating image data by reading an image in the second reading operation corresponding to the step-out state, any method that enables generation of image data having a resolution lower than a high resolution corresponding to a low speed may be employed. For example, after image data having a high resolution has been generated by using all pieces of data, the generated image data may be processed into an image having a low resolution. Further, as the method for thinning out acquired data when image data is generated, the acquired data may be thinned out when the acquired data is output to the control portion 31 from the reading portion 22. Moreover, the acquired data may be thinned out by increasing a time interval between successive image reading operations executed by the reading portion 22. In addition, in the case where, merely, the time interval between successive image reading operations is increased, there is a possibility in that an appropriate image cannot be acquired due to saturation of an amount of received light. Thus, it is preferable to control the amount of received light in accordance with the increased time interval. For example, switching for turning on/off of the light source 28 may be performed. Further, an amount of light emitted from the light source 28 may be reduced. Further, a switch for switching a light reception mode to/from a light non-reception mode of the light reception portion 29 may be provided.

In the above embodiment, when it is determined whether or not the motor 27 enters the step-out state, the reading portion 22 may be caused to move in the first direction X1 from a position which is located at a side nearer the connection portions 14 than the reference position P and at which the detection portion 23 does not detect the reading portion 22. That is, when the detection portion 23 has detected the reading portion 22, it may be determined that the motor 27 has entered the step-out state. Further, for example, the motor 27 is driven such that the reading portion 22 located at a position that is distanced from the reference position P toward the side of the connection portions 14 by a first distance is caused to move in the first direction X1 by a second distance. Thereafter, the motor 27 is driven such that the reading portion 22 is caused to move in the second direction X2 by a distance resulting from summing the first distance and the second distance. Further, when the reading portion 22 has crossed the reference position P, it may be determined that the motor 27 has entered the step-out state.

In the above embodiment, when the reading portion 22 is caused to move in order to determine whether or not the motor 27 enters the step-out state, an amount of electric current supplied to the motor 27 in the case where the reading portion 22 is caused to move in the first direction X1 may be different from an amount of electric current supplied to the motor 27 in the case where the reading portion 22 is caused to move in the second direction X2. That is, in the case where the reading portion 22 is caused to move in the first direction X1, a small amount of electric current may be supplied to the motor 27, and in the case where the reading portion 22 is caused to move in the second direction X2, a large amount of electric current may be supplied to the motor 27. Moreover, in the case where the amount of electric current supplied to the motor 27 is changed, the speed of the movement of the reading portion 22 in the first direction X1 may be the same as the speed of the movement of the reading portion 22 in the second direction X2.

In the above embodiment, when it is determined whether or not the motor 27 enters the step-out state, the speed of the reading portion 22 that is caused to move in the first direction X1 may be changed stepwise. That is, for example, in the case where, first, when the reading portion 22 is caused to move at the high speed, the motor 27 has entered the step-out state, next, it may be determined whether or not the motor 27 enters the step-out state by causing the reading portion 22 to move in the first direction X1 at the middle speed. Further, in the case where the motor 27 has not entered the step-out state during the movement of the reading portion 22 at the middle speed, when the scanning operation is executed in the second reading operation corresponding to the step-out state, the reading of an image may be performed at the middle speed in the case where a command for instructing the execution of a scanning operation at the low resolution or the middle resolution has been input.

In the above embodiment, when it is determined whether or not the motor 27 enters the step-out state, the amount of electric current supplied to the motor 27 may be increased before decreasing the movement speed of the reading portion 22. That is, for example, first, it is determined whether or not the motor 27 enters the step-out state by supplying the motor 27 with a small amount of electric current and causing the reading portion 22 to move in the first direction X1 at the high speed. Further, in the case where the motor 27 has entered in the step-out state, it may be determined whether or not the motor 27 enters the step-out state by supplying the motor 27 with a large amount of electric current and causing the reading portion 22 to move in the first direction X1 at the high speed.

In the above embodiment, a DC motor may be employed as the motor 27.

In the above embodiment, an amount of electric current supplied to the motor 27 in the first reading operation may be the same as an amount of electric current supplied to the motor 27 in the second reading operation.

In the above embodiment, the determination as to whether or not the motor 27 enters the step-out state is sufficient, provided that the relevant determination is made at at least one time. For example, the relevant determination may be made only once immediately after the power on, and thereafter the scanning operation may be executed on the basis of a selected operation.

In the above embodiment, the determination as to whether or not the motor 27 enters the step-out state may be made at at least one of timing points that are a timing point immediately after the power on, a timing point of executing the preview operation, a timing point of executing the scanning operation, a timing point after the scanning operation has been executed at at least one predetermined time, and a timing point after a predetermined elapsed time from a latest determination as to whether or not the motor 27 enters the step-out state. That is, the determination as to whether or not the motor 27 enters the step-out state may not be made at all of these timing points. Further, the determination as to whether or not the motor 27 enters the step-out state may be made at any timing point different from these timing points.

In the above embodiment, the reference position P may not be the reading start position. That is, the reference position P can be set at any position within a range of the movement of the reading portion 22. Further, in the case where, for example, the reference position P is set at a position nearer the connection portions 14 than the reading start position, a direction directed from the reference position P toward the operation portion 15 may be made the first direction, and a direction directed from the operation portion 15 toward the reference position P may be made the second direction. Further, in order to perform detection at the reference position P, a detection portion, such as a sensor, may be provided. Further, it may be determined whether or not the reading portion 22 has crossed the reference position P by causing the reading portion 22 to read a pattern, such as a gradation pattern or a stripe shaped pattern, which is drawn on the cover 13 in advance. In addition, when such a pattern is drawn on the cover 13, it is preferable to draw the pattern at a position that is not related to the reading of an image on the target object.

In the above embodiment, the speed at which the reading portion 22 is caused to move when it is determined whether or not the motor 27 enters the step-out state is sufficient, provided that the speed at which the reading portion 22 is caused to move in the second direction X2 is lower than the speed at which the reading portion 22 is caused to move in the first direction X1. That is, the first speed may be made the high speed and the second speed may be made the middle speed. Further, the first speed may be made the middle speed and the second speed may be made the low speed.

In the above embodiment, the second speed at which the reading portion 22 is caused to move when it is determined whether or not the motor 27 enters the step-out state may be made higher than the first speed. That is, after having driven the motor 27 so as to cause the reading portion 22 to move from the reference position P at the first speed (for example, the low speed) by a predetermined distance, the control portion 31 may drive the motor 27 so as to cause the reading portion 22 to move in the second direction X2 at the second speed (for example, the high speed) higher than the first speed by the predetermined distance. Further, in this case, when the reading portion 22 has returned to the reference position P and the detection portion 23 has detected the reading portion 22, the control portion 31 may determine that the motor 27 has not entered the step-out state and may select the first reading operation. In contrast, when the reading portion 22 has not returned to the reference position P and the detection portion 23 has not detected the reading portion 22, the control portion 31 may determine that the motor 27 has entered the step-out state and may select the second reading operation. Further, such a determination as to whether or not the motor 27 enters the step-out state may be made when the scanning operation is executed. That is, for example, after having caused the reading portion 22 to move in the first direction X1 at the low speed by a scanning distance, the control portion 31 may drive the motor 27 so as to cause the reading portion 22 to move in the second direction X2 at the high speed by the scanning distance and thereby may detect whether or not the reading portion 22 has returned to the reference position P.

In the above embodiment, for example, a detector for detecting an environment, such as a temperature sensor, may be provided, and the control portion 31 may determine whether or not the motor 27 is likely to enter the step-out state, on the basis of the result of detection by the detector. For example, in the case where a detected temperature is lower than a predetermined temperature, the control portion 31 may determine that the motor 27 is likely to enter the step-out state.

In the above embodiment, the image reading apparatus 11 may be made a multi-function machine or a coping machine that is mounted in a recording apparatus, such as a printer. Further, the image reading apparatus 11 may be configured to include a document transport portion (an automatic document feeder (ADF) apparatus). Further, the image reading apparatus 11 may be made an apparatus that has the same configuration as that inside the body 12 at the side of the cover 13 and that is capable of simultaneously reading images on the both faces of a target object, and image data may be generated such that the movement speed of a reading portion installed at the side of the cover 13 is also changed in accordance with the result of a determination as to whether or not the step-out state occurs. Further, the image reading apparatus 11 may output read-in data to the host apparatus 36, and image data may be generated by the host apparatus 36. That is, the image reading apparatus 11 and a program that is stored in the host apparatus 36 and that is used for generation of image data may constitute an image reading system.

The entire discovery of Japanese Patent Application No.: 2015-008361, filed Jan. 20, 2015 is expressly incorporated by reference herein.

What is claimed is:

1. An image reading apparatus comprising:
   a reading portion that reads an image on a target object;
   a driving source that causes the reading portion to move; and
   a control portion that controls the reading portion and the driving source,
   wherein:
      when a first reading operation is instructed thereby causing the reading portion to move at a first moving speed by the driving source and causing the reading portion to read the image, in a case where the driving source does not enter a step-out state, the control portion causes the driving source and the reading portion to execute the first reading operation,
      when the first reading operation is instructed, in a case where the driving source enters the step-out state, the control portion executes a second operation thereby causing the reading portion to move at a second moving speed slower than the moving speed by the driving source and causing the reading portion to read the image,
      when a third reading operation is instructed thereby causing the reading portion to move at the second moving speed by the driving source and causing the reading portion to read the image, the control portion causes the driving source and the reading portion to execute the third reading operation, and
      a resolution of image data of the image read by the second reading operation is lower than a resolution of image data of the image read by the third reading operation.

2. The image reading apparatus according to claim 1, wherein a resolution of image data of the image read by the first reading operation is the same as the resolution of the image data of the read by the second reading operation.

3. The image reading apparatus according to claim 1,
   wherein the reading portion reciprocates by moving in a first direction toward a side far from a reference position and moving in a second direction opposite the first direction,
   wherein, after having driven the driving source so as to cause the reading portion to move in the first direction at a speed by a predetermined distance from the reference position, the control portion drives the driving source so as to cause the reading portion to move in the second direction at a second speed lower than the first speed by the predetermined distance, and selects the second reading operation in a case where the reading portion has crossed the reference position during the movement of the reading portion in the second direction, and
   wherein the reference position corresponds to a reading start position.

4. The image reading apparatus according to claim 3, wherein the control portion determines whether or not the driving source enters the step-out state at any one or ones of timing points including a timing point immediately after a power on of the image reading apparatus, a timing point of executing a preview operation, a timing point of executing a scanning operation, a timing point after the scanning operation has been executed at least one predetermined time, and a timing point after a predetermined elapsed time from a latest determination as to whether or not the driving source enters the step-out state.

5. The image reading apparatus according to claim 4, wherein, every time the control portion determines whether or not the driving source enters the step-out state, the control portion selects the first reading operation or the second reading operation, whichever is to be executed by the reading portion in reading of the image.

6. The image reading apparatus according to claim 5, wherein the control portion executes the first reading operation by supplying the driving source with a first electric current, and the control portion executes the second reading operation by supplying the driving source with a second electric current whose amount is larger than an amount of the first electric current.

7. The image reading apparatus according to claim 3, wherein, in a case where the driving source enters the step-out state, the control portion causes the reading portion to execute the second reading operation simultaneously with causing the driving source to cause the reading portion to move at the second movement speed, and generates image data having the same resolution as a resolution in a case where the control portion causes the reading portion to execute the first reading operation simultaneously with causing the driving source to cause the reading portion to move at the first movement speed, on the basis of data having been read through the execution of the second reading operation by the reading portion.

8. The image reading apparatus according to claim 1, wherein an amount of electric current supplied to the driving source during the second reading operation is larger than the amount of electric current supplied during the first reading operation.

9. The image reading apparatus according to claim 1,
   wherein determining that the driving source has entered the step-out state is performed, at least in part, by determining that the reading portion has moved beyond a designated reference position, and
   wherein, when the driving source does enter the step-out state, the driving source enters the step-out state at least partially in response to an identified change to an ambient environment of the driving source.

10. The image reading apparatus according to claim 1,
    wherein, in a case where the driving source has not yet entered the step-out state but a prediction indicates that the driving source is sufficiently likely to enter the step-out state, the driving source causes the reading portion to operate at the second moving speed even though the driving source is not in the step-out state, and
    wherein, when the driving source does enter the step-out state, the driving source enters the step-out state at least partially in response to an identified change to an ambient environment of the driving source.

* * * * *